Dec. 21, 1954 J. F. JORNET 2,697,639
SEPARABLE RIM FOR AUTOMOBILE TIRES
Filed Aug. 20, 1952 2 Sheets-Sheet 1
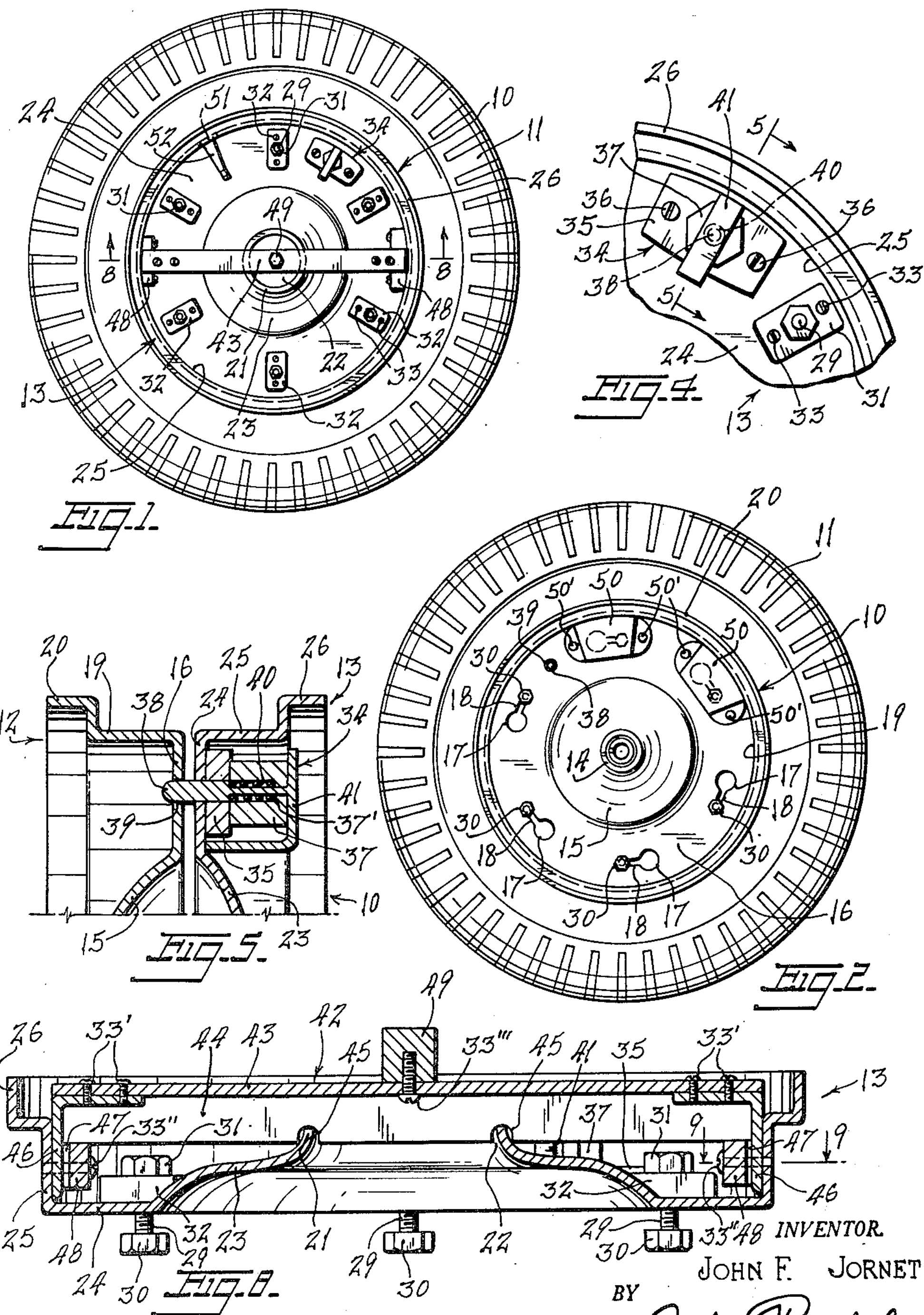
INVENTOR.
JOHN F. JORNET
BY Zoltan Polachek
ATTORNEY Dec. 21, 1954 J. F. JORNET 2,697,639
SEPARABLE RIM FOR AUTOMOBILE TIRES
Filed Aug. 20, 1952 2 Sheets-Sheet 2
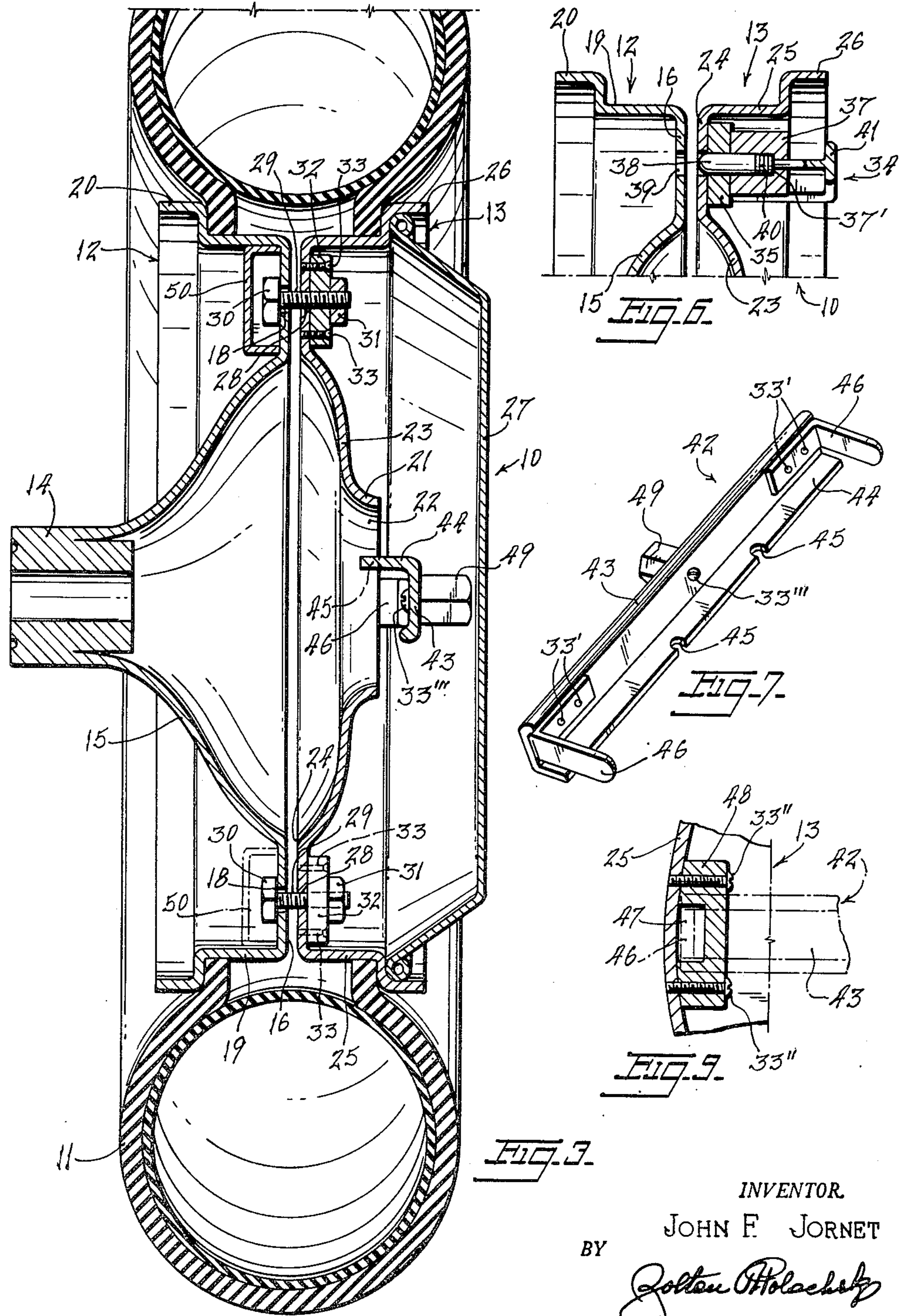
INVENTOR.
JOHN F. JORNET
BY
Zoltan P. Polachek
ATTORNEY United States Patent Office 2,697,639 Patented Dec. 21, 1954

2,697,639

SEPARABLE RIM FOR AUTOMOBILE TIRES

John F. Jornet, New York, N. Y.

Application August 20, 1952, Serial No. 305,427

5 Claims. (Cl. 301—9)

This invention relates to separable rims for wheels of the type having pneumatic tires for use on automobiles, trucks or the like.

It is a principal object of the present invention to provide an improved wheel adapted to securely retain a tube inflated rubber tire, this wheel comprising separable halves which may be readily and easily separated to facilitate removal of flat tires and which eliminate the necessity of prying the tire from the rims in the manner of conventional wheels now in use.

It is another object of the present invention to provide an improved wheel adapted to securely retain a tube-inflated rubber tire, this wheel having an outer separable half which may be readily and easily removed to permit tire changing without the necessity of loosening and tightening nuts and bolts as is done with wheels currently in use.

It is a still further object of the present invention to provide an improved wheel having separable wheel halves which includes novel means for simultaneously operating all of the members for locking the outer half upon the inner half by a simple angular displacement of one half relative to the other.

Other objects of the present invention are to provide an improved wheel adapted to securely retain a rubber tire which is of simple construction, inexpensive to manufacture, which permits removal of the tire by a motorist unfamiliar with the working parts of an automobile with a minimum expenditure of time and energy, is compact and durable, which will have long life and which retains the tire in a highly efficient and easily removable manner.

For further comprehension of the invention and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front elevational view of a wheel embodying the features of the present invention showing a tire mounted thereon and with the cover plate removed.

Fig. 2 is a rear elevational view of the wheel shown in Fig. 1.

Fig. 3 is a vertical sectional view of the wheel shown in Fig. 1 and having a cover plate mounted thereon.

Fig. 4 is an enlarged fragmentary view of a portion of the wheel shown in Fig. 1 and showing the locking device in operative position.

Fig. 5 is a vertical sectional view taken along line 5—5 of Fig. 4.

Fig. 6 is a vertical sectional view similar to Fig. 5 showing the locking device in inoperative position.

Fig. 7 is a perspective view of the turning handle.

Fig. 8 is a transverse sectional view taken along line 8—8 of Fig. 1.

Fig. 9 is a vertical sectional view taken along line 9—9 of Fig. 8.

Referring now in detail to the figures, in the practice of my invention there is shown a wheel, referred to collectively as 10, having a tube-inflated rubber tire 11 mounted thereon.

The wheel 10 is made up of separable inner and outer halves, referred to collectively as 12 and 13, respectively.

The inner half 12 consists of a cylindrical hub 14 adapted to be connected to a vehicle in a well known manner and integrally formed with a circular, outwardly curved central portion 15 and a vertically extending, flat, circular outer portion 16 provided with a plurality of spaced slots consisting of enlarged openings 17 communicating with narrow openings 18 as shown in Figs. 2 and 3. A circular wall 19 adapted to support the tire 11 is integrally formed at right angles to the outer portion 16 at the periphery thereof and is provided with an integrally formed tire engaging inner rim 20.

The outer half 13 consists of a hub-like portion 21 having a circular hole 22 at the center thereof and integrally formed with a circular, outwardly curved, central portion 23 and a vertically extending, flat, circular, outer portion 24. A circular wall 25 adapted to support the tire 11 is integrally formed at right angles to the outer portion 24 at the periphery thereof and is provided with an integrally formed tire engaging outer rim 26 adapted to resiliently receive a cover plate 27.

Referring now particularly to Figs. 3 and 4, the outer half 13 is provided at the outer portion 24 with a plurality of holes 28 adapted to receive a plurality of bolts 29 having bolt-heads 30 adapted to fit freely into the enlarged openings 17 of the inner half 12 but larger than the narrow openings 18, the bolts 29 being secured to the outer portion 24 by nuts 31 through spacing elements 32. The spacing elements 32 are secured to the outer portion 24 by screws 33. To assemble the wheel, the two halves 12 and 13 are brought together about the tire 11 as shown in Fig. 3 with the outer portions 16 and 24 coinciding and the bolt-heads 30 extending into the enlarged openings 17. The two halves 12 and 13 are then angularly displaced relative to each other until the bolts 29 slide into the narrow openings 18 with the undersurface of the bolt-heads 30 engaging the outer portion 16 surrounding the narrow openings 18 whereby to secure the outer portion 16 to the outer portion 24 as clearly shown in Fig. 2.

Referring now particularly to Figs. 4, 5 and 6, in further practice of my invention I provide a releasable locking device, referred to collectively as 34, positioned on the outer portion 24 of the half 13 between the spacing members 32. The locking device 34 consists of a spacing member 35 secured to the outer portion 24 by means of screws 36 and having an upwardly extending member 37 connected thereto by means of screws, not shown. The outer portion 24, the spacing member 35 and the member 37 have aligned holes adapted to receive a lock-pin 38, the outer portion 16 having a hole 39 adapted to align with these holes when the two halves 12 and 13 are in the position relative to each other shown in Fig. 2. The lock pin is normally urged into the hole 39 by a helical spring 40 located within the aligned hole in the upwardly extending member 37, connected at one end to the upwardly extending member 37 and at the other end of the neck of the lock-pin 38 as shown in Fig. 5. The lock-pin 38 is maintained against outward displacement from the member 37 by a shoulder 37' provided therein. The lock-pin is provided with an L-shaped handle 41 adapted to be rotated in and out of engagement with the spacing member 35. When this L-shaped handle 41 is in the position shown in Figs. 4 and 5 the end of that portion of the handle parallel to the lock-pin is out of engagement with the spacing member and rests on the outer portion 24, thus permitting the spring 40 to pull the lock-pin 38 into the hole 39 whereby to prevent angular displacement of the two wheel halves relative to each other. By pulling the handle upward it may be rotated to the position shown in Fig. 6, with the lower end of the portion of the handle parallel to the lock-pin in engagement with the upper surface of the spacing member thus maintaining the lock-pin out of the hole 39 and permitting angular displacement of the two wheel halves relative to each other.

Referring now particularly to Figs. 7, 8 and 9, in further practice of my invention I provide a removable hand tool, referred to collectively as 42, for rotating the outer wheel half 13 into and out of engagement with wheel half 12. The hand tool 42 consists of an elongated handle 43 having an integrally formed, downwardly extending portion 44 provided with slots 45 adapted to engage the hub-like portion 21 of the outer wheel half 13, the handle 43 being adapted to normally rest within the outer rim 26 as clearly shown in Figs. 1 and 8. A pair of L-shaped pins 46 are fixedly secured to the ends of the handle 43 by screws 33', the downwardly extending portions of these pins being tapered inwardly and adapted to resiliently engage slots 47 provided in a pair of members 48 fixedly secured at diametrically opposed positions to the circular outer wall 25 by screws 33''. The handle 43 is provided at the center thereof with a knob 49 secured by a screw 33''' for convenience in handling the same when out of engagement with the outer wheel half.

To prevent mud and dirt from the road from getting into the wheels when the wheels are in motion, I provide cover plates 50 secured to the outer side of the inner wheel half surrounding the enlarged openings 17 and the narrow openings 18 by screws 50', as shown in Fig. 2. The circular wall 25 is also provided with the usual hole 51 to permit the insertion therein of the usual tube inlet 52 as shown in Fig. 1.

In operation, the inner wheel half 12 is connected to a jacked-up vehicle in conventional manner by means of the hub 14. A rubber tire 11 is then readily inserted over the circular wall 19 into position against the inner rim 20. The outer half 13 is then brought into position with the outer portions 16 and 24 coinciding and the bolt-heads 30 extending into the enlarged openings 17 and the outer rim 26 engaging the tire 11, as shown in Fig. 3.

The outer half 13 is then rotated by means of the tool handle 42 until the bolts 29 slide into the narrow openings 18 with the undersurface of the bolt-heads 30 engaging the outer portion 16 surrounding the narrow openings whereby to secure the outer portion 16 to the outer portion 24 as clearly shown in Fig. 2. This operation brings the hole 39 into alignment with the lock-pin 38, which is brought into engagement with the hole 39 by rotating the L-shaped handle 41 out of engagement with the spacing member 35. The two halves 12 and 13 are now locked against angular displacement relative to each other and will securely retain the tire 11 in position on the wheel during operation of the vehicle. The cover plate 27 is then inserted into the outer wheel half to provide a compact wheel of pleasing appearance. The tire may be quickly and efficiently removed when desired by reversing the above operations.

It should now be apparent that there has been provided an improved wheel comprising separable halves which may be quickly and easily separated by an unskilled motorist to remove flat tires without the necessity of loosening and tightening nuts and bolts and which eliminates the necessity of prying the tire from the rims. It should also be apparent that there has been provided an improved wheel having separable wheel halves which includes novel means for securing one wheel half upon the other by simple angular displacement of the halves relative to each other and which further includes novel means for releasably locking the wheel halves when in the above described position.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A vehicle wheel for receiving a rubber tire comprising separate inner and outer wheel halves, said inner half comprising a hub, an outwardly curved central portion integrally formed to said hub, a flat outer portion integrally formed to said central portion and a cylindrical wall integrally formed at substantially right angles to said outer portion at the periphery thereof, said wall being formed with an integral inner rim adapted to engage the tire at one side thereof, said outer half comprising a hub-like portion, a second outwardly curved central portion integrally formed to said hub-like portion, a second flat outer portion integrally formed to said second central portion, and a second cylindrical wall integrally formed at substantially right angles to said second outer portion at the periphery thereof, said second wall being formed with an integral outer rim adapted to engage the tire at the other side thereof, said second outer portion being adapted to coincide with said first outer portion, studs mounted on said second outer portion extending parallel to the axis of the wheel and arranged in a circle, an enlarged head on each stud, said first outer portion having corresponding slots arranged in a circle, each of said slots having an enlarged portion adapted to receive an enlarged head and a narrow portion, said second outer portion being secured to said first outer portion by inserting the enlarged heads in said enlarged portions and then rotating said second outer portion to locate the studs within said narrow portions and means for releasably locking said studs within said narrow portions, said locking means comprising a spacing element rigidly secured to said second outer portion, an upwardly extending member rigidly secured to said spacing element, said second outer portion, said spacing element and said upwardly extending member having aligned holes, a lock-pin adapted to reside in said aligned holes, said first outer portion having a hole adapted to align with said aligned holes in said spacing member, said second outer portion and said upwardly extending member when said studs are within said narrow portions, spring means for normally urging said lock-pin into engagement with said hole in said first outer portion and a substantially L-shaped handle rigidly secured to said lock-pin external to said aligned holes adapted to be rotated in and out of engagement with said spacing element.

2. A vehicle wheel for receiving a rubber tire comprising separate inner and outer wheel halves, said inner half comprising a hub, an outwardly curved central portion integrally formed to said hub, a flat outer portion integrally formed to said central portion and a cylindrical wall integrally formed at substantially right angles to said outer portion at the periphery thereof, said wall being formed with an integral inner rim adapted to engage the tire at one side thereof, said outer half comprising a hub-like portion, a second outwardly curved central portion integrally formed to said hub-like portion, a second flat outer portion integrally formed to said second central portion, and a second cylindrical wall integrally formed at substantially right angles to said second outer portion at the periphery thereof, said second wall being formed with an integral outer rim adapted to engage the tire at the other side thereof, said second outer portion being adapted to coincide with said first outer portion, studs mounted on said second outer portion extending parallel to the axis of the wheel and arranged in a circle, an enlarged head on each stud, said first outer portion having corresponding slots arranged in a circle, each of said slots having an enlarged portion adapted to receive an enlarged head and a narrow portion, said second outer portion being secured to said first outer portion by inserting the enlarged head portions and then rotating said second outer portion to locate the studs within said narrow portions and means for releasably locking said studs within said narrow portions, said locking means comprising a spacing element rigidly secured to said second outer portion, an upwardly extending member rigidly secured to said spacing element, said second outer portion, said spacing element and said upwardly extending member having aligned holes, a lock-pin adapted to reside in said aligned holes, said first outer portion having a hole adapted to align with said aligned holes in said spacing member, said second outer portion and said upwardly extending member when said studs are within said narrow portions, spring means for normally urging said lock-pin into engagement with said hole in said first outer portion and a substantially L-shaped handle rigidly secured to said lock-pin external to said aligned holes adapted to be rotated in and out of engagement with said spacing element, and means for rotating said outer half relative to said inner half whereby to slide said studs into said narrow portions comprising an elongated handle adapted to normally fit within said outer rim and having a downwardly extending portion provided with a pair of slots adapted to engage said hub-like portion, a pair of substantially L-shaped pins rigidly secured to the ends of said handle, a pair of substantially rectangular members rigidly secured to the inside of said second outer circular wall at diametrically opposed positions, said rectangular members each having a slot adapted to resiliently receive a downwardly extending portion of said L-shaped pins.

3. A vehicle wheel for receiving a rubber tire comprising separate inner and outer wheel halves, said inner half comprising a hub, an outwardly curved central portion integrally formed to said hub, a flat outer portion integrally formed to said central portion and a cylindrical wall integrally formed at substantially right angles to said outer portion at the periphery thereof, said wall being formed with an integral inner rim adapted to engage the tire at one side thereof, said outer half comprising a hub-like portion, a second outwardly curved central portion integrally formed to said hub-like portion, a second flat outer portion integrally formed to said second central portion, and a second cylindrical wall integrally formed at substantially right angles to said second outer portion at the periphery thereof, said second wall being formed with an integral outer rim adapted to engage the tire at the other side thereof, said second outer portion being adapted to coincide with said first outer portion, studs mounted on said second outer portion extending parallel to the axis of the wheel and arranged in a circle, an enlarged head on each stud, said first outer portion having corresponding slots arranged in a circle, each of said slots having an enlarged portion adapted to receive an enlarged head and a narrow portion, said second outer portion being secured to said first outer portion by inserting the enlarged head in said enlarged portions and then rotating said second outer portion to locate the studs within said narrow portions and means for releasably locking said studs within said narrow portions, said locking means comprising a spacing element rigidly secured to said second outer portion, an upwardly extending member rigidly secured to said spacing element, said second outer portion, said spacing element and said upwardly extending member having aligned holes, a lock-pin adapted to reside in said aligned holes, said first outer portion having a hole adapted to align with said aligned holes in said spacing member, said second outer portion and said upwardly extending member when said studs are within said narrow portions, spring means for normally urging said lock-pin into engagement with said hole in said first outer portion and a substantially L-shaped handle rigidly secured to said lock-pin external to said aligned holes adapted to be rotated in and out of engagement with said spacing element, and substantially rectangular cover plates rigidly secured to the outer side of said inner wheel half surrounding said corresponding slots in said first outer portion whereby to prevent dirt from entering said slots.

4. A vehicle wheel for receiving a rubber tire comprising separate inner and outer wheel halves, said inner half comprising a hub, an outwardly curved central portion integrally formed to said hub, a flat outer portion integrally formed to said central portion and a cylindrical wall integrally formed at substantially right angles to said outer portion at the periphery thereof, said wall being formed with an integral inner rim adapted to engage the tire at one side thereof, said outer half comprising a hub-like portion, a second outwardly curved central portion integrally formed to said hub-like portion, a second flat outer portion integrally formed to said second central portion, and a second cylindrical wall integrally formed at substantially right angles to said second outer portion at the periphery thereof, said second wall being formed with an integral outer rim adapted to engage the tire at the other side thereof, said second outer portion being adapted to coincide with said first outer portion, studs mounted on said second outer portion extending parallel to the axis of the wheel and arranged in a circle, an enlarged head on each stud, said first outer portion having corresponding slots arranged in a circle, each of said slots having an enlarged portion adapted to receive an enlarged head and a narrow portion, said second outer portion being secured to said first outer portion by inserting the enlarged head in said enlarged portions and then rotating said second outer portion to locate the studs within said narrow portions and means for releasably locking said studs within said narrow portions, said locking means comprising a spacing element rigidly secured to said second outer portion, an upwardly extending member rigidly secured to said spacing element, said second outer portion, said spacing element and said upwardly extending member having aligned holes, a lock-pin adapted to reside in said aligned holes, said first outer portion having a hole adapted to align with said aligned holes in said spacing member, said second outer portion and said upwardly extending member when said studs are within said narrow portions, spring means for normally urging said lock-pin into engagement with said hole in said first outer portion and a substantially L-shaped handle rigidly secured to said lock-pin external to said aligned holes adapted to be rotated in and out of engagement with said spacing element, and a substantially pie-shaped cover plate adapted to resiliently engage the undersurface of said outer rim.

5. The vehicle wheel of claim 4 and including a pair of diametrically spaced slots on said outer wall, and a hand tool having pin means seated in said slots to engage said outer wheel half to rotate the outer wheel half into and out of engagement with the inner wheel half when a tire is to be changed.

References Cited in the file of this patent

UNITED STATES PATENTS

| Number | Name | Date |
|---|---|---|
| 924,334 | Fouch | June 8, 1909 |
| 1,382,087 | Hurlburt | June 21, 1921 |
| 1,382,672 | Racer | June 28, 1921 |
| 1,422,408 | Bellamore et al. | July 11, 1922 |
| 2,308,959 | Brink | Jan. 19, 1943 |

FOREIGN PATENTS

| Number | Country | Date |
|---|---|---|
| 166,444 | Great Britain | July 21, 1921 |
| 508,449 | Germany | Sept. 27, 1930 |